Jan. 23, 1940.                J. R. HUGHES                    2,188,096
          CONVERTIBLE CAR FOR RAILWAY AND HIGHWAY USE
                     Filed June 8, 1938           5 Sheets-Sheet 1
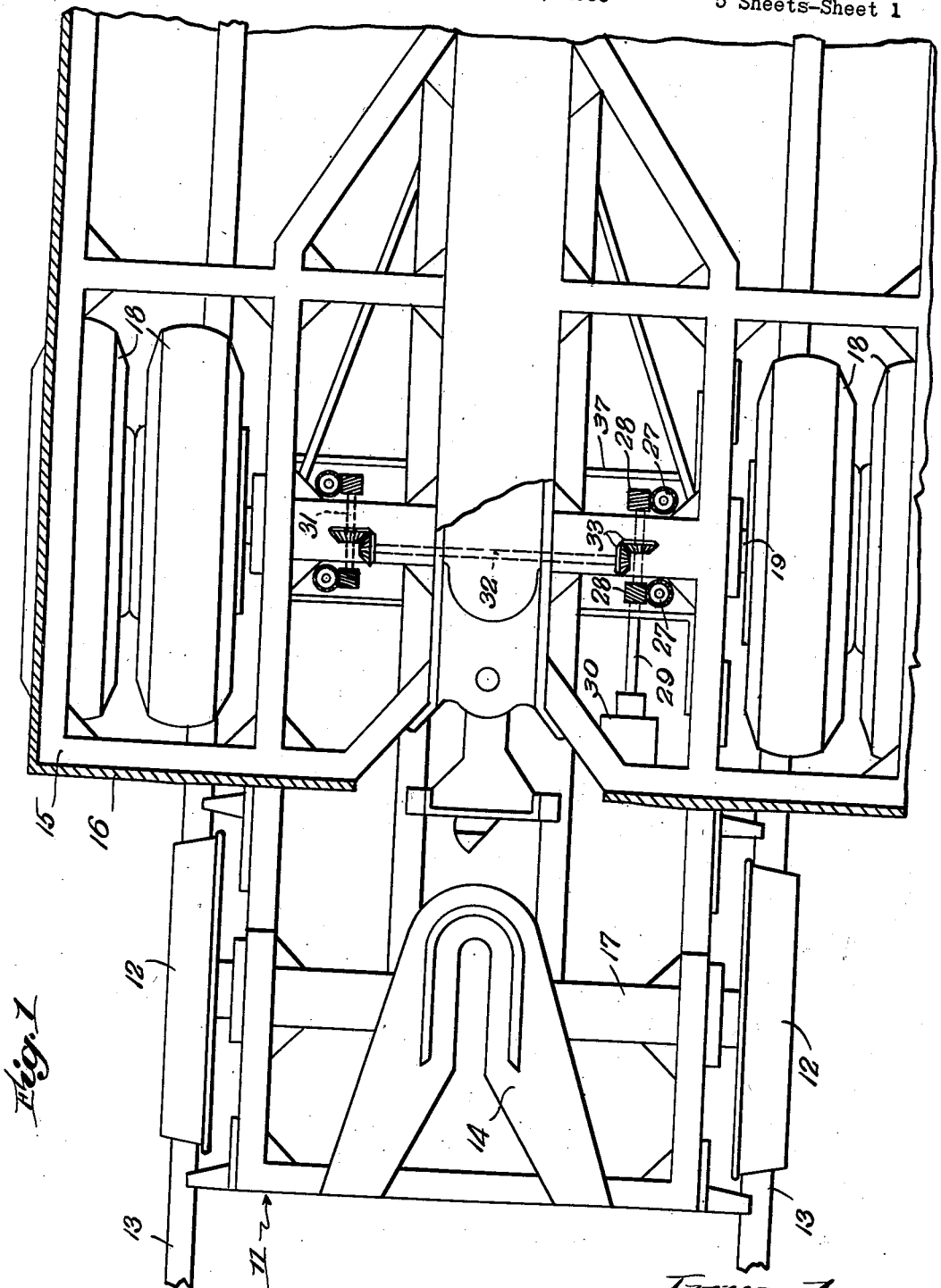

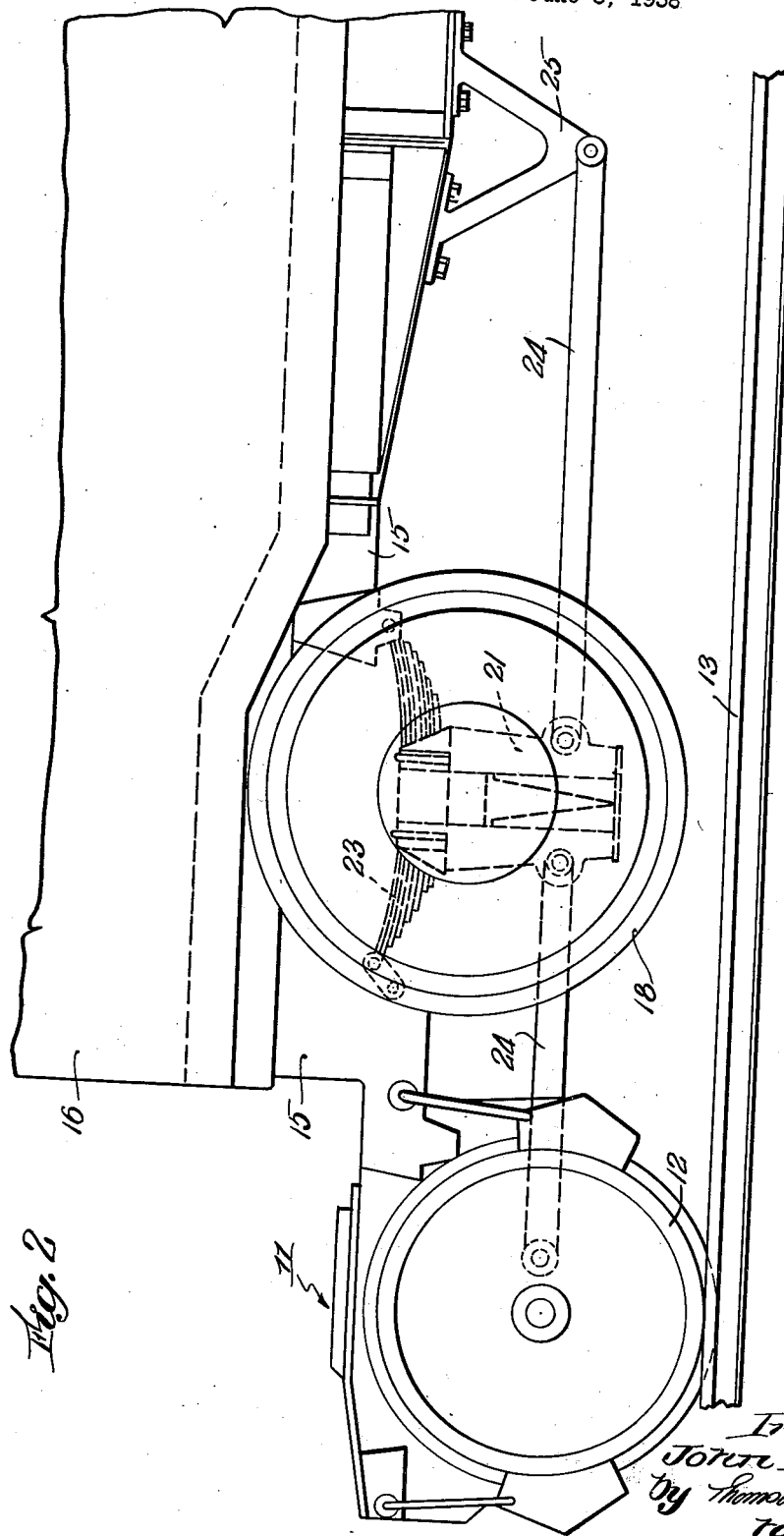

Jan. 23, 1940.　　　　　J. R. HUGHES　　　　　2,188,096
CONVERTIBLE CAR FOR RAILWAY AND HIGHWAY USE
Filed June 8, 1938　　　　5 Sheets-Sheet 3
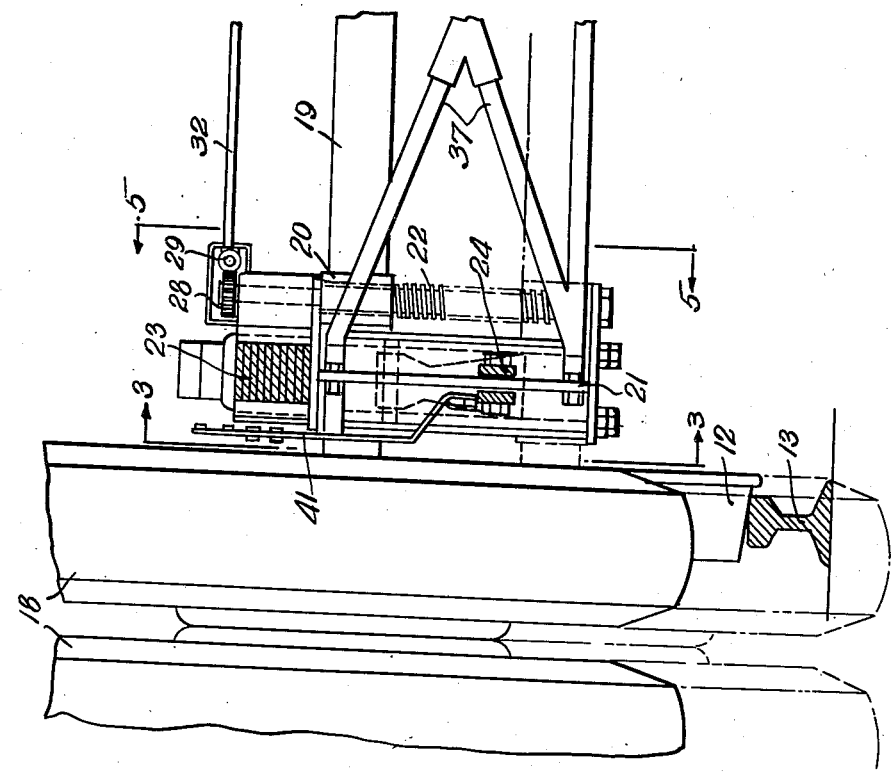
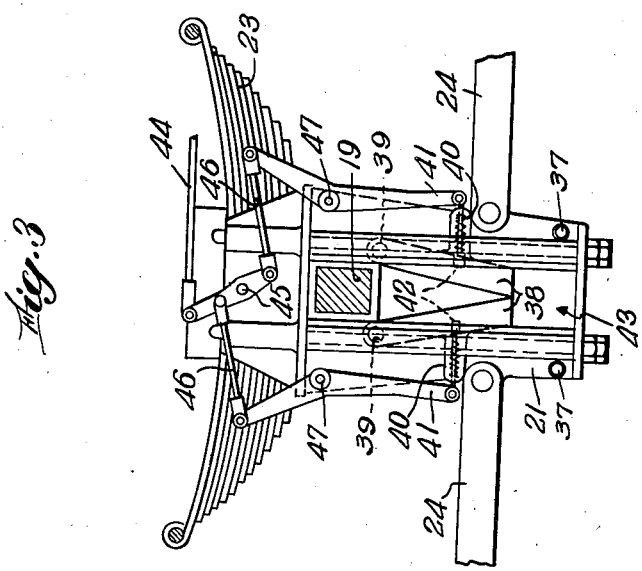
Inventor:
John R. Hughes.
by Thomson & Thomson
his Attys.

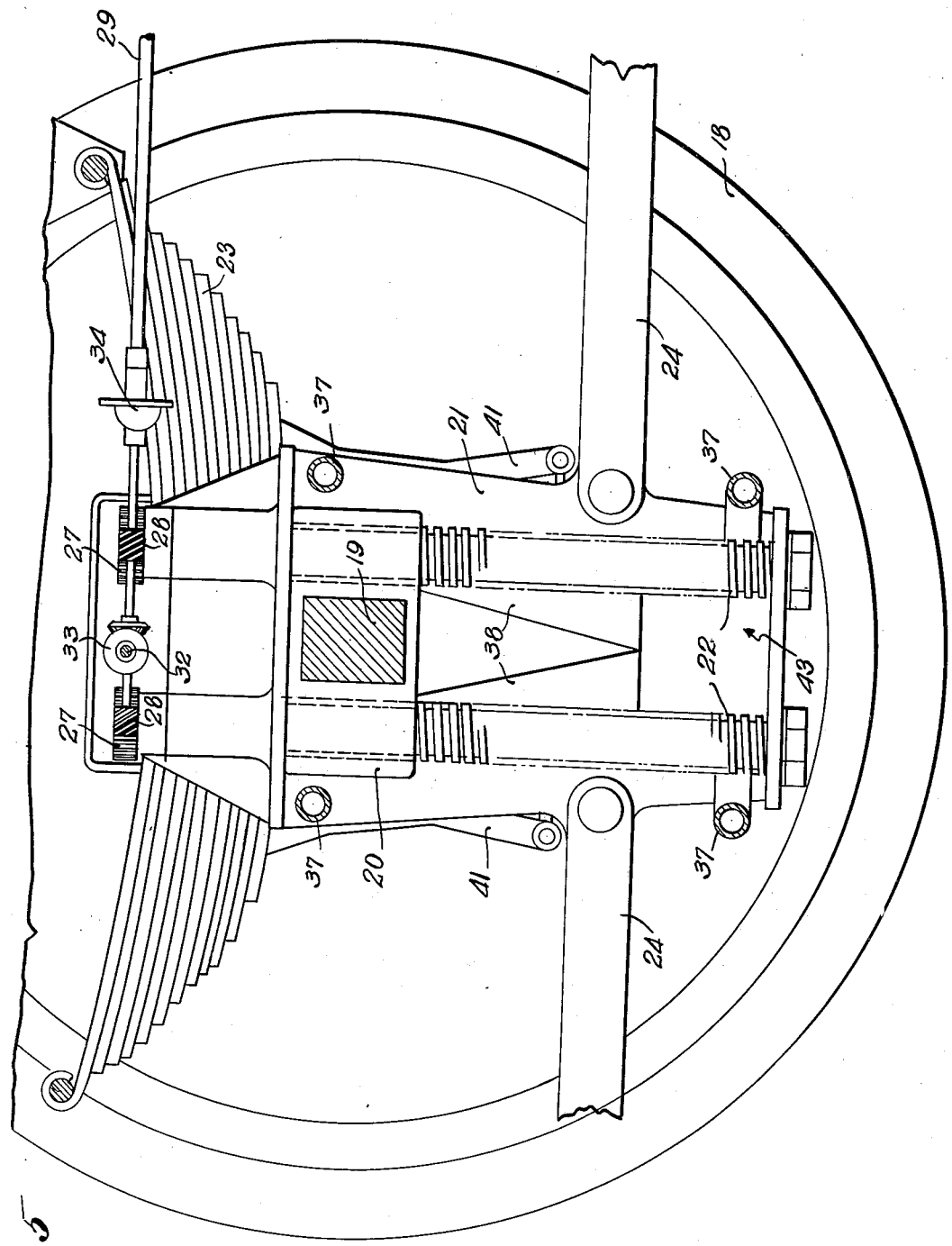

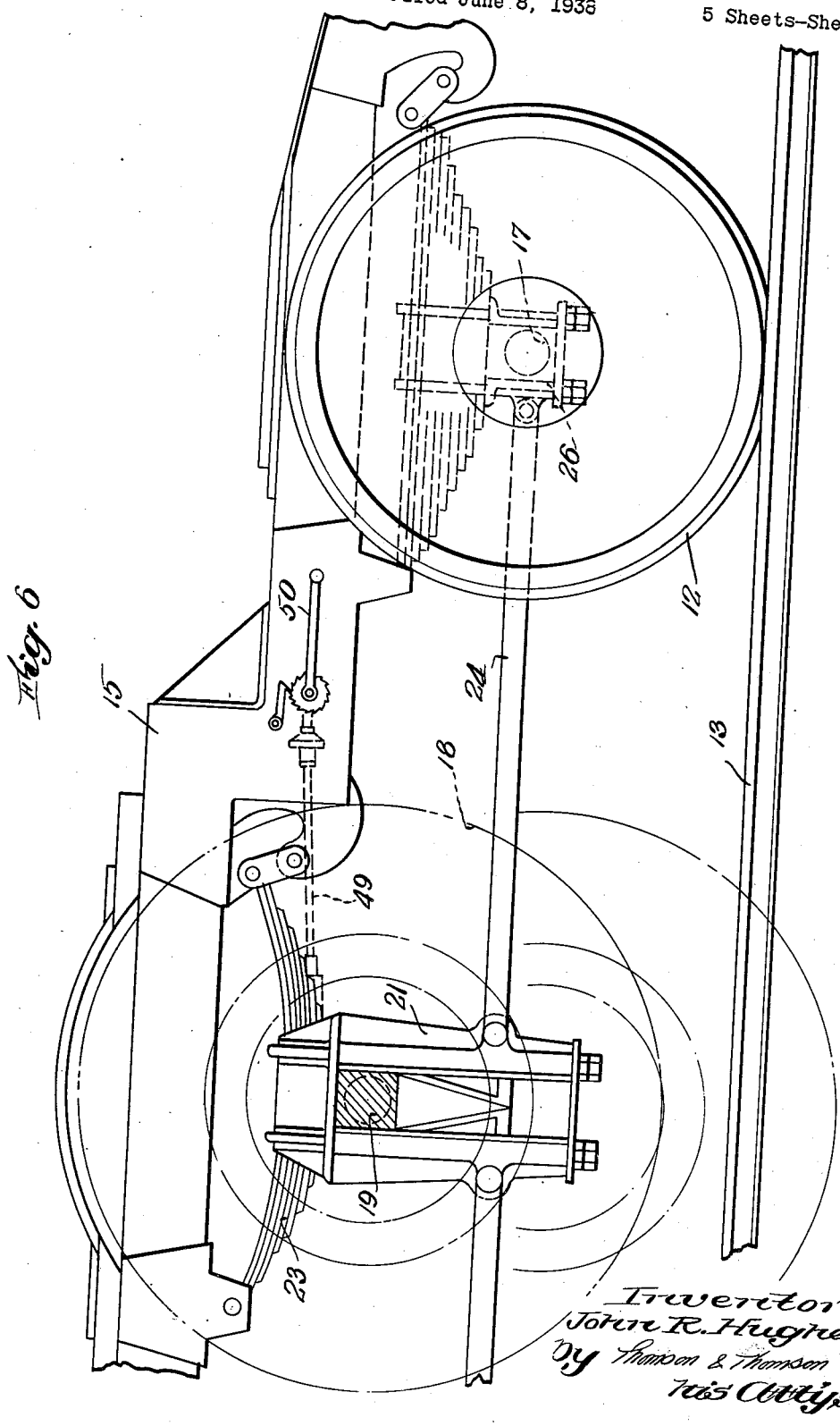

Patented Jan. 23, 1940

2,188,096

UNITED STATES PATENT OFFICE 2,188,096

CONVERTIBLE CAR FOR RAILWAY AND HIGHWAY USE

John R. Hughes, Boston, Mass.

Application June 8, 1938, Serial No. 212,490

4 Claims. (Cl. 105—215)

This invention relates to cars or vehicles adapted for both highway and railway transportation, and pertains more particularly to improvements in trailer-type cars adapted to carry freight or other merchandise and of the general character described in my Patent No. 2,066,836, dated January 5, 1937, in which the purposes and advantages of a convertible car which may be drawn over the roads by a conventional tractor or hauled over the rails (in a consecutive series or train) by a Diesel, electric or steam engine, are fully explained.

In my said patent, the cars or trailers were equipped with demountable road wheels detachably secured upon the axle of the rail wheels, so that the detached road wheels could be swung beneath the frame of the car by a pivoted demounting arm, when the car was to be used on the rails.

The principal purpose of the present invention is to provide a convertible car, preferably of the trailer type, in which the road wheels are carried by an auxiliary, highway axle mounted in bearing blocks which are slidable in pedestals connected to springs permanently secured to the frame or chassis of the car, and which may be raised or lowered in said pedestals by screw jacks operated by any suitable source of power, either manual, mechanical, electric or pneumatic. This arrangement permits the road wheels to be raised above the bottom of the rail wheels when the car is to be hauled on the rails, or to be lowered below the bottom of the rail wheels when the car is to be driven on the road, without disturbing the rail wheels or their axle and without demounting the road wheels from the highway axle; and it affords a simple, easy, economical and efficient mode of quickly converting the car—either loaded or unloaded—from rail use to road use, and vice versa.

By adopting a car designed primarily for railway use or use on the highway—particularly a trailer-type vehicle which may be readily attached to a highway tractor—I have thus avoided many of the complications which others have encountered in attempting to adapt a highway truck—with its dirigible front wheels and differential-driven rear wheels—for railway usage; and my car will necessarily stand up longer and be more serviceable for railway transportation.

A recommended embodiment of my invention is illustrated in the accompanying drawings, but it will be understood that the structural details of the apparatus herein shown and described may be varied to suit particular conditions without departing from the essence of the invention as defined in the appended claims.

In the drawings,

Fig. 1 is a fragmentary plan view of the chassis of a trailer type car equipped with the improved road wheel actuating mechanism, a portion of the body of the car being shown in section.

Fig. 2 is a side view looking to the left of Fig. 1, showing the road wheels in elevated position and the rail wheels resting on the track;

Fig. 3 is a detail view of the pedestal or guide for the highway axle, taken on line 3—3 of Fig. 4.

Fig. 4 is an end view of the pedestal and associated mechanism, looking rearwardly toward the face of the wheels shown in Figs. 1 and 2.

Fig. 5 is an enlarged section taken approximately on line 5—5 of Fig. 4; and

Fig. 6 is a view similar to Fig. 2, but showing the opposite side of the car and illustrating an optional form of operative means for actuating the screws which raise or lower the road wheels.

In the particular form chosen for the purpose of illustration, the car adapted for both rail and road travel is of the trailer type disclosed in my said Patent No. 2,066,836, the frame having a rearward extension indicated generally at 11, supported by rail wheels 12 riding on railway tracks 13 (when the car is on the rails) and equipped with a coupling 14 to which the forward end of a similar trailer type car may be connected for railway use. It will be understood that the front of the car (not shown in the drawings) will be provided with a complemental coupling element, so that it may be attached to the coupling of another car or to a road tractor, as explained in said patent, and that the frame indicated generally at 15 may be provided with any suitable type of body 16, these structural details forming no part of the present invention.

The rail wheels are mounted upon an axle 17 and permanently connected to the projecting portion 11 of the frame, in accordance with any common or known practice in constructing railway or freight cars. The road wheels 18, which may be of the dual type, are mounted upon an independent highway axle 19 spaced forwardly of the axle 17 and mounted in a pair of supporting blocks 20 at opposite sides of the car. The supporting blocks 20 are guided for vertical movement in the guideways of a pair of pedestals or carriages 21, and are moved upwardly or downwardly in the pedestals by one or more screws 22 which pass through threaded openings in the blocks 20, two such screws being shown for each block.

The respective pedestals are suitably attached to a heavy spring 23 which is mounted upon the frame 15, and are preferably braced by longitudinal tie rods 24, one of which leads to a bracket 25 secured to the frame, and the other to the housing 26 of the rail axle 17. These bracing rods are pivotally attached to their mountings, at their respective ends. Transverse tie rods 37 connect the two pedestals on opposite sides of the car to each other and to the frame 15. The respective pedestals are thus securely mounted in proper position for guiding the axle blocks 20 and highway axle 19, although they may move in a vertical plane relative to the frame, under action of the springs 23, when the road wheels are lowered for highway travel.

The actuating screws 22 are mounted vertically in the pedestals 21, and the upper ends of the screws are provided with gears 27 meshing with worms 28 on a shaft 29, operated (in the form shown in Figs. 1 to 5) by a pneumatic motor 30. A similar operating shaft 31, equipped with worm gears, is provided for actuating the screws which are similarly mounted in the pedestal on the opposite side of the car; and the two shafts 29 and 31 are driven simultaneously by the motor 30 through a connecting shaft 32 geared thereto by cooperating beveled gears 33 as shown in Figs. 1 and 5. The motor driven shaft 29 may be equipped with a universal joint 34 (Fig. 5), and it will be understood that the motor—whether pneumatic or electric—is reversible, so that the screws 22 may be rotated selectively in either direction, to raise or lower the axle blocks 20.

In the raised position of the blocks 20 the highway axle supports the road wheel 18 a substantial distance above the bottom of the rail wheels 12, so that the former will in no wise interfere with operation of the car upon the rails 13; and in the lowermost position of the blocks, the road wheels extend substantially below the bottom of the rail wheels, to support the car for highway travel in such a manner that the rail wheels do not interfere with highway operation. The relationship between the two positions of the road wheels is indicated by the full line and broken line illustrations thereof in Fig. 4 of the drawings.

In order to insure against accidental elevation of the highway axle 19 when the car is traveling on the road with the road wheels in lowermost position, locking jaws 38 are preferably pivoted as at 39 at opposite sides of each pedestal 21 in such a manner that they may move into or out of the guideway in which the axle 19 slides. The respective pedestals carry bosses 40 housing spring pressed plungers 42 connected to the respective jaws and to pivoted levers 41, and the springs normally tend to move the jaws into the guideway so that their lower ends meet each other as shown in Figs. 3 and 5 when the axle 19 is in uppermost position.

As the axle is lowered by operation of the screws 22, the locking jaws 38 are spread apart against the yielding resistance of the spring pressed plungers, and the axle passes therebetween and below the ends of the jaws to occupy the space indicated at 43 in said figures. As soon as the axle passes through the jaws they are automatically closed by the spring pressed plungers so that they overlie the top of the lowered axle and thus lock it in position for highway travel.

When it is desired to elevate the axle for railway travel, the locking jaws 38 are opened by releasing mechanism including a rod 44 (which may be manually operated), a link 45 and pull rods 46 pivoted to the upper ends of the respective crank arms 41 which, in turn, are pivoted to the pedestal at 47 and are connected to the jaws through the plungers 42, as aforesaid.

In the optional form shown in Fig. 6, the construction is similar to that just described except that the shaft 49 for rotating the axle-elevating screws is manually operated by a crank handle 50. It will be evident that any other suitable means may be provided for rotating the screws 22, and that other structural details of the mechanism herein described may be varied to meet particular conditions without departing from the essence of this invention as defined in the appended claims.

A convertible car constructed in accordance with this invention permits the use of dual-type road wheels on either side of the vehicle without exceeding the statutory tread-width limits for highway vehicles; it provides easy, convenient, and efficient means for converting the vehicle from railway use to highway use and vice versa, without altering the position of the permanent rail wheels or railway axle; and allows the use of the sturdy frame and permanent axle springs which are necessary for continuous use of the vehicle on the rails as well as on the roads over a long period of time.

I claim:

1. A convertible car of the character described, comprising a frame, rail wheels and an axle therefor, for supporting the frame when the car is on the railway, a highway axle independent of and spaced from the first axle, road wheels carried by the highway axle, bearing blocks for the highway axle, leaf springs permanently attached to the frame, pedestals rigidly connected to the respective springs at the center thereof, said pedestals having guideways and said blocks being mounted for sliding movement in the pedestals, and means for raising and lowering the blocks in the guideways and for holding the blocks in lowered position, thereby to raise or lower the road wheels above or below the bottom of the rail wheels and to support the weight of the car on the road wheels when the latter are positioned for highway travel.

2. A convertible car of the character described, comprising a frame, rail wheels and an axle therefor, for supporting the frame when the car is on the railway, a highway axle independent of and spaced from the first axle, road wheels carried by the highway axle, bearing blocks for the highway axle, pedestals resiliently connected to the frame, said pedestals having vertical guideways and said blocks being mounted for vertical sliding movement in the guideways of the pedestals, a pair of rotatable screws connected to respective pedestals and extending parallel to the respective guideways on opposite sides thereof, said screws engaging the respective blocks for raising and lowering the latter relative to the former, thereby to raise or lower the road wheels above or below the bottom of the rail wheels, and means for rotating the screws.

3. A convertible car of the character described, comprising a frame, rail wheels and an axle therefor, for supporting the frame when the car is on the railway, a highway axle independent of and spaced from the first axle, road wheels carried by the highway axle, bearing blocks for the highway axle, pedestals resiliently connected to the frame, said pedestals having guideways and said blocks being mounted for sliding movement in the guideways of the pedestals, a pair of rotatable screws mounted in the pedestals parallel to and on opposite sides of the respective guideways, said screws engaging the respective blocks for raising and lowering the latter relative to the former, thereby to raise or lower the road wheels above or below the bottom of the rail wheels, means for rotating the screws, and means pivoted to the respective pedestals and engaging the blocks for releasably locking them in lowered position.

4. A convertible car of the character described, comprising a frame, rail wheels and an axle therefor, for supporting the frame when the car is on the railway, a highway axle independent of and spaced from the first axle, road wheels carried by the highway axle, bearing blocks for the highway axle, pedestals resiliently connected to the frame, said pedestals having vertical guideways and said blocks being mounted for vertical sliding movement in the guideways of the pedestals, rotatable screws engaging the respective pedestals and blocks for raising and lowering the latter relative to the former, thereby to raise or lower the road wheels above or below the bottom of the rail wheels, means for simultaneously rotating said screws, and spring-tensioned locking means pivoted to the pedestals and movable into the respective guideways from opposite sides thereof for automatically engaging the blocks when they are in lowered position.

JOHN R. HUGHES.